(12) United States Patent
Jackson (10) Patent No.: US 9,744,977 B2
(45) Date of Patent: Aug. 29, 2017

(54) METHOD TO INSPECT AND CORRECT RAILCAR BRAKE SHOE ALIGNMENT

(71) Applicant: John M. Jackson, Texarkana, AR (US)

(72) Inventor: John M. Jackson, Texarkana, AR (US)

( * ) Notice: Subject to any disclaimer, the term of this patent is extended or adjusted under 35 U.S.C. 154(b) by 337 days.

(21) Appl. No.: 14/686,849

(22) Filed: Apr. 15, 2015

(65) Prior Publication Data
US 2016/0207549 A1  Jul. 21, 2016

Related U.S. Application Data

(60) Provisional application No. 62/104,729, filed on Jan. 17, 2015.

(51) Int. Cl.
| | |
|---|---|
| *B61H 1/00* | (2006.01) |
| *F16D 66/02* | (2006.01) |
| *B61H 15/00* | (2006.01) |
| *B60T 17/22* | (2006.01) |

(52) U.S. Cl.
CPC .............. *B61H 1/00* (2013.01); *B60T 17/228* (2013.01); *B61H 1/003* (2013.01); *B61H 15/00* (2013.01); *F16D 66/02* (2013.01); *Y10T 29/49771* (2015.01)

(58) Field of Classification Search
CPC .......... B61H 15/00; B61H 1/00; B61H 13/38; B61H 13/36; B60T 17/228; B60T 17/22; B60T 17/221; F16D 66/02; Y10T 29/49771; G01L 5/28
See application file for complete search history.

(56) References Cited

U.S. PATENT DOCUMENTS 5,456,337 A * 10/1995 Jackson ................. B61H 13/38
188/212

\* cited by examiner

*Primary Examiner* — Jermie Cozart
(74) *Attorney, Agent, or Firm* — Eldredge Law Firm (57) ABSTRACT

A method to inspect and compensate for wear on a brake shoe of a railcar brake system includes removing the railcar brake shoe from a brake head of the railcar brake system, placing a brake inspection device between the brake head and a railcar wheel, applying brake load, measuring a gap formed between the brake head and the wheel, measuring the thickness of a stop block of the brake inspection device positioned between the brake head and the railcar wheel, determining an adjustment distance as the difference between the gap measurement and the thickness of the stop block, and adjusting an end extension of the railcar brake system in accordance to the determined adjustment distance.

3 Claims, 14 Drawing Sheets

METHOD TO INSPECT AND CORRECT RAILCAR BRAKE SHOE ALIGNMENT

BACKGROUND

1. Field of the Invention

The present invention relates generally to brake systems, and more specifically, to a system and method to inspect and correct brake shoe alignment of railcars.

2. Description of Related Art

Figure 1:
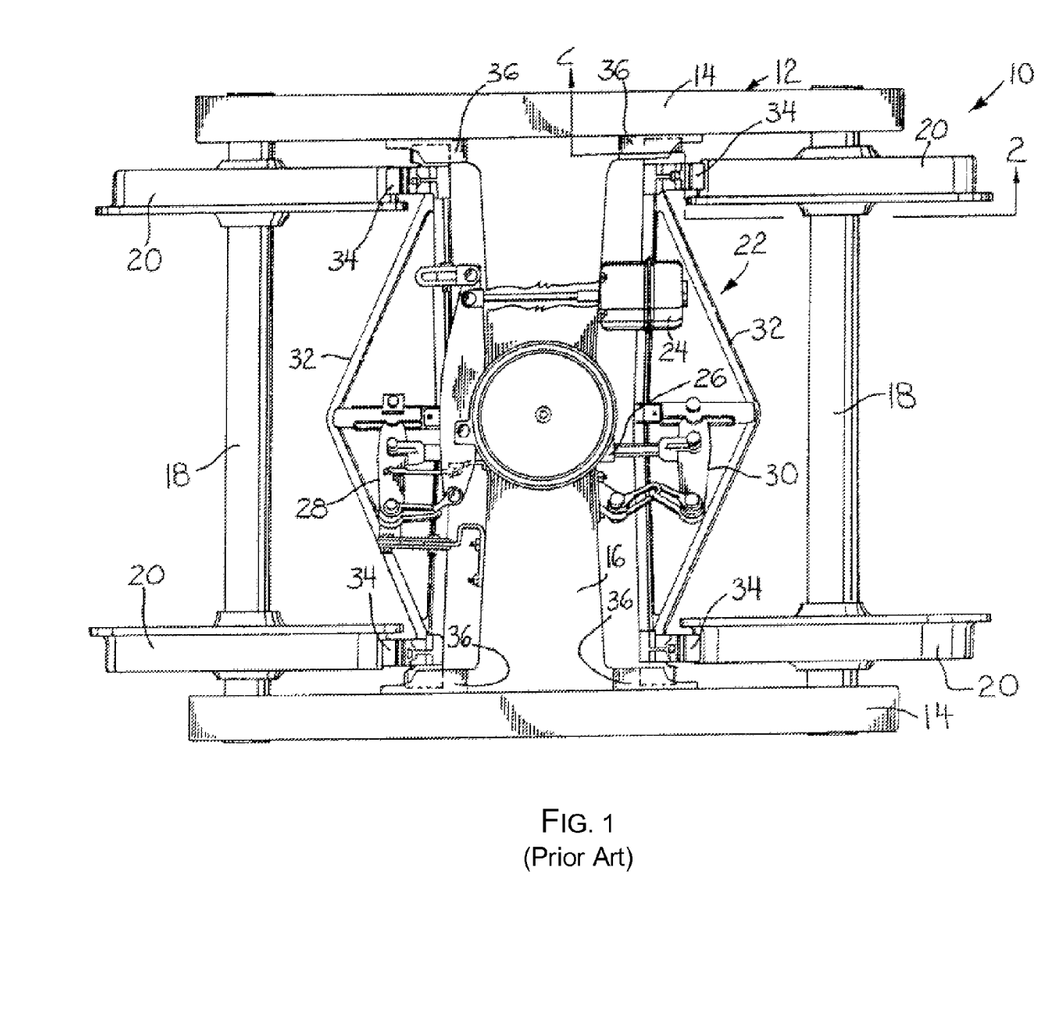
FIG. 1 is a top plan view of a conventional railcar braking system.
Figure 2:
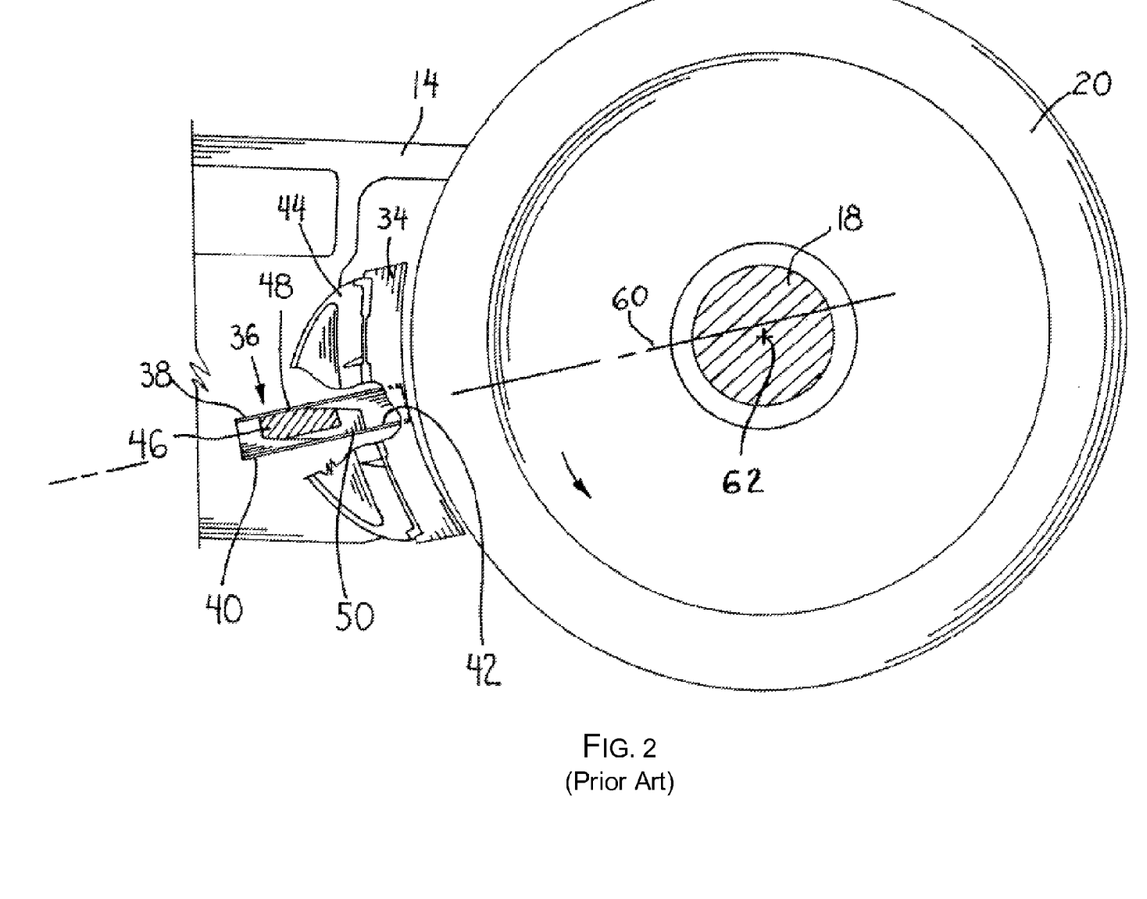
FIG. 2 is a side view of the braking system of FIG. 1.

Braking systems for railcars are well known in the art and are effective means to slow down or stop a railcar during transit. FIGS. 1 and 2 depict a conventional braking system for a railcar 10. Referring first to FIG. 1, reference numeral 10 generally designates a railcar having a frame chassis 12 which generally includes spaced frame rails 14 connected by bolster 16. Axles 18 accommodate rotatable wheels 20 and are journalled in frame rails 14 in a common manner.

Brake system 22 is connected to railcar 10 and serves to slow and/or stop the car in a common manner. Brake system 22 may be employed in the truck mounted fashion shown or may be employed in other brake system designs commonly known in the industry. System 22 as shown includes generally a power driven cylinder 24, slack adjuster 26, connecting linkages and levers 28, 30, and brake beams 32 which carry brake shoes 34. Brake shoes 34 are positioned adjacent to wheels 20 as shown in the drawings and serve to slow and/or stop the railcar 10 by friction.

Frame rails 14 each include guide channel parts 36. As shown in FIG. 2, each guide channel 36 is defined by top wall 38 and spaced bottom wall 40 to define a slot or channel 42. Typically, channel 36 are oriented at an oblique angle relative to the upper and lower edges of frame rails 14 as shown.

Each opposed brake beam 32 carries brake shoes 34, preferably of a fiber composite material. Brake shoes 34 are secured to brake head 44 of brake beams 32 as by mounting straps (not shown). Each brake beam 32 includes an end extension 46 located at each end of each beam. In the exemplary embodiment, end extension 46 is slidably fitted in channel part 36 and reciprocates within channel 42.

In the exemplary embodiment, end extension 46 is of a generally rectangular of polygonal cross-section, for example a polygonal cross-section is a generally rectangular cross-sectional configuration with noted exceptions. As shown, two of the opposite diagonal corners define oblique angle surfaces. The other two opposite diagonal corners define spaced parallel surfaces 48, 50 which are offset longitudinally from each other. Extension parts 46 are either fixedly secured to brake beams 32 or may be integrally formed as part of each beam.

FIG. 2 illustrates brake system 22 in an unbraked position with brake shoes 34 spaced from railcar wheels 20. In this position brake beams 32 are retracted with the centerline 60 of each guide channel 42 slightly offset from the center axis 62 of each wheel 20.

Figure 3:
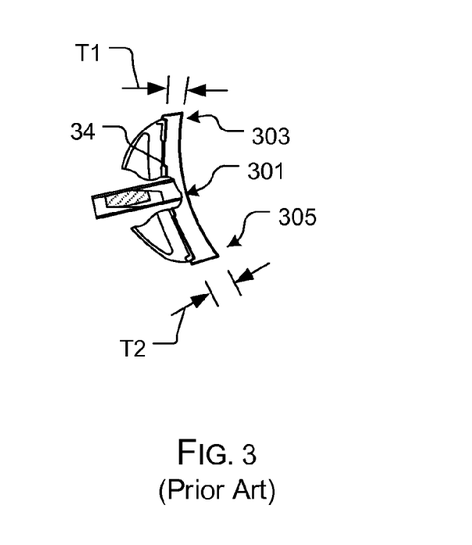
FIG. 3 is a partial side view of the braking system head of FIG. 2.
Figure 4A:
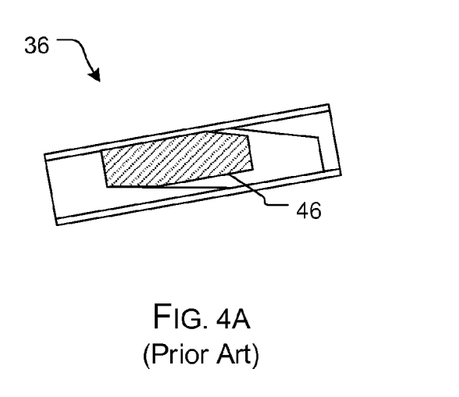
FIGS. 4A and 4B are side views of the end extension and channel of the braking system of FIG. 3.
Figure 4B:
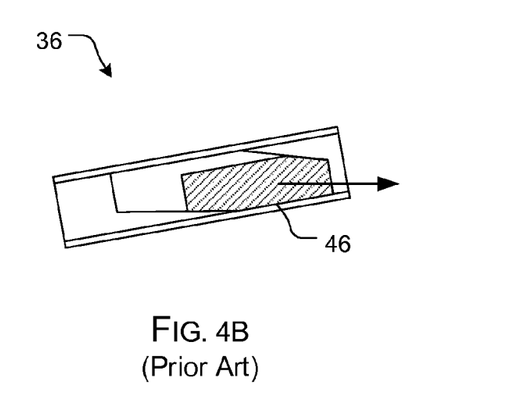

As depicted in FIG. 3, a common disadvantage associated with system 22 is the wear created on the brake shoes 34 after use. In the exemplary embodiment, the brake shoe 34 has greater wear on surface 301 at an upper surface area 303 when compared to the lower surface area 305. Thus, it should be understood that the shoes do not wear evenly, thereby creating different thicknesses T1, T2, which in turn causes rotation of the end extension as the end extension slides within guide channel 36, as depicted in FIGS. 4A and 4B.

It should be understood that having different shoe thicknesses could cause damage to the components of the railcar. Conventional methods to correct the above-discussed problems include the time consuming and expensive process of inspecting, discarding, and replacing the shoe 34 if uneven brake shoe wear exist.

Although great strides have been made in the area of systems and methods to inspect and replace railway braking shoes, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods of inspection braking shoes. Specifically, the system and method of the present application provides rapid and effective means to reduce the wear tapering of the brake shoe. This feature results in significant cost reductions and improves braking efficiency by maintaining the alignment of the railcar brake beam and associated brake system rigging. Reducing brake shoe taper reduces loss of material evident in tapered shoes. This along with longer life of non-tapered shoes saves significant maintenance costs. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 5:
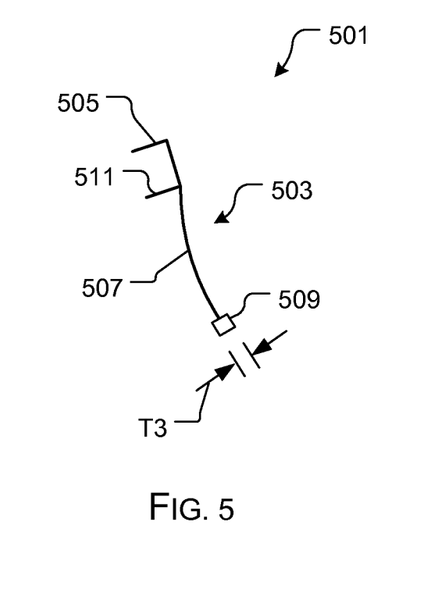
FIGS. 5 and 6 are respective side and front views of a braking inspection device in accordance with a preferred embodiment of the present application.
Figure 6:
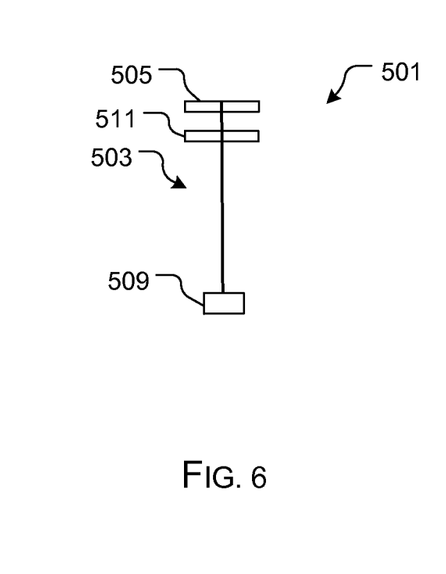

Referring now to the drawings wherein like reference characters identify corresponding or similar elements throughout the several views, FIGS. 5 and 6 depict respective side and front views of an inspection device 501 in accordance with a preferred embodiment of the present application. It will be appreciated that the inspection device 501 overcomes one or more of the above-listed problems commonly associated with the conventional devices and methods for inspecting brake shoe wear.

In the contemplated embodiment, device 501 includes an elongated body 503 with a handle 505 at one end and a block 509 at an opposing end. The handle 505 is connected to the block 509 via a member 507. A ledge 511, which in the preferred embodiment is rectangular in shape, is attached to member 507 and is configured to engage with a top surface 701 of the brake head 44 during use, see, e.g., FIG. 7.

Figure 7:
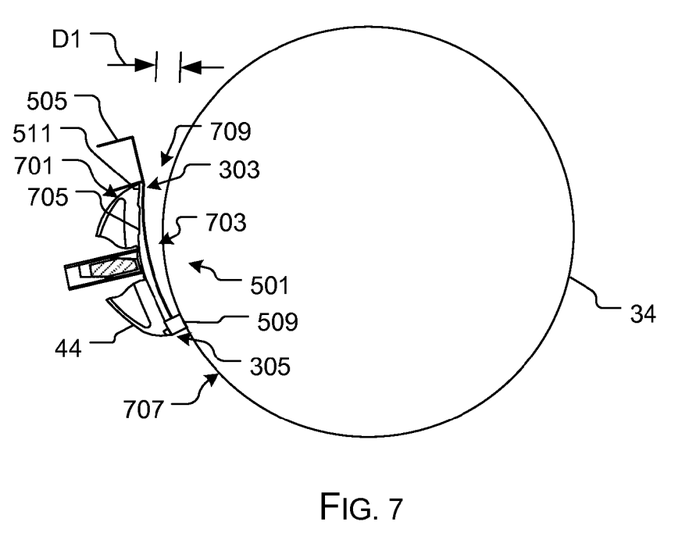
FIG. 7 is a side view of the braking system and associated wheel.
Figure 8:
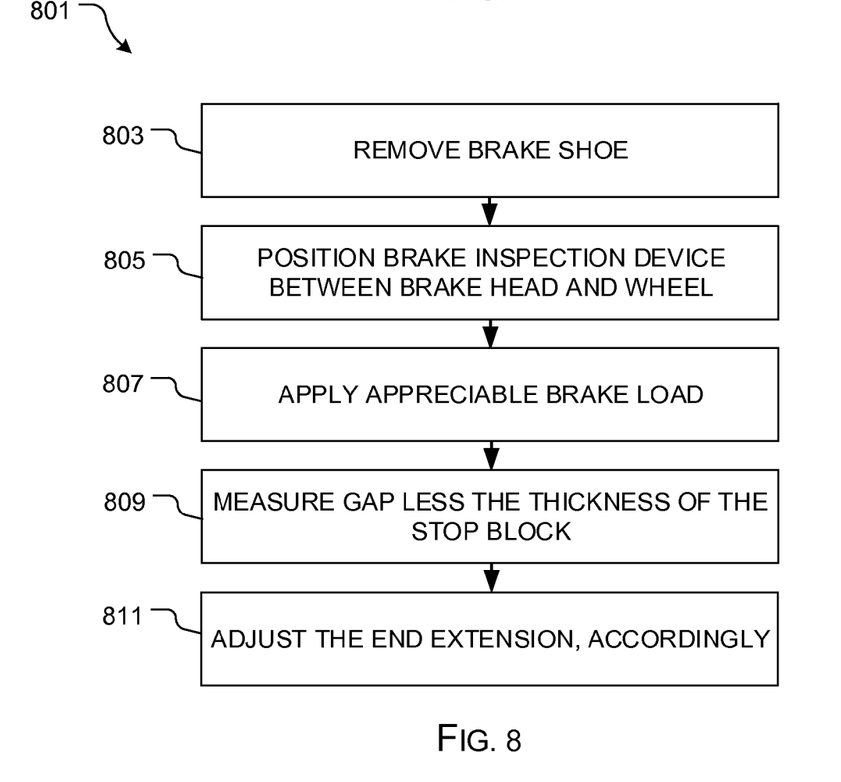
FIG. 8 is a simplified flowchart depicting the preferred inspection process in accordance with a preferred embodiment of the present application.

The intended positioning and use of device 501 is shown in respective FIGS. 7 and 8. In the contemplated embodiment, device 501 is positioned within an opening 703 formed between head face 705 and wheel treaded surface 707 of wheel 34. As discussed below, when the brake is applied, the block 509 comes into contact with face 705 and tread 707, which in turn create a gap 709 having a distance D1.

FIG. 8 depicts a flowchart 801 of steps in accordance with the preferred process of utilizing device 501. The first step 803 includes the process of removing the brake shoe 34 from head 44, as depicted in FIG. 7. The device 501 is then placed within opening 703 and the brake load is applied such that the device 501 comes into contact with face 705 and wheel tread surface 707, as depicted in steps 805, 807. It should be noted that only enough brake force needs to be applied to fully apply both brake heads against the wheel with the end extensions restrained diagonally in the side pockets. Some beams are twisted and some side pockets are at different angles. Thereafter, the inspector measures the gap 709 formed during the process and subtracts the width of the block 509; the difference being the amount of shoe taper to be corrected by adjustment to the end extension, as depicted in steps 809, 811 and discussed more fully below.

Figure 9:
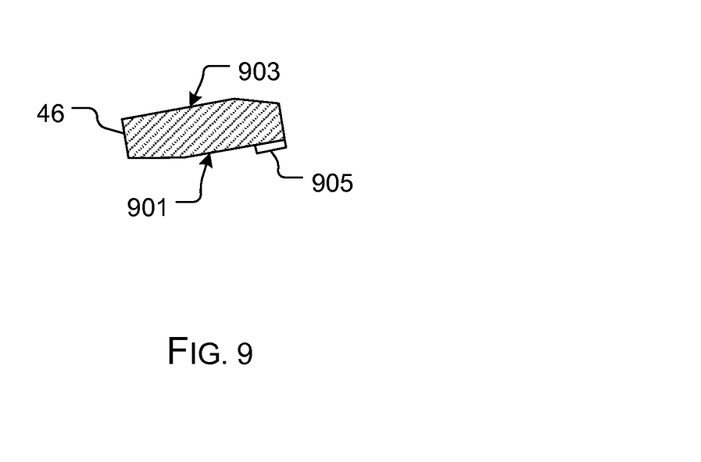
FIGS. 9 and 10 are side views of an end extension of the system of FIG. 8.
Figure 10:
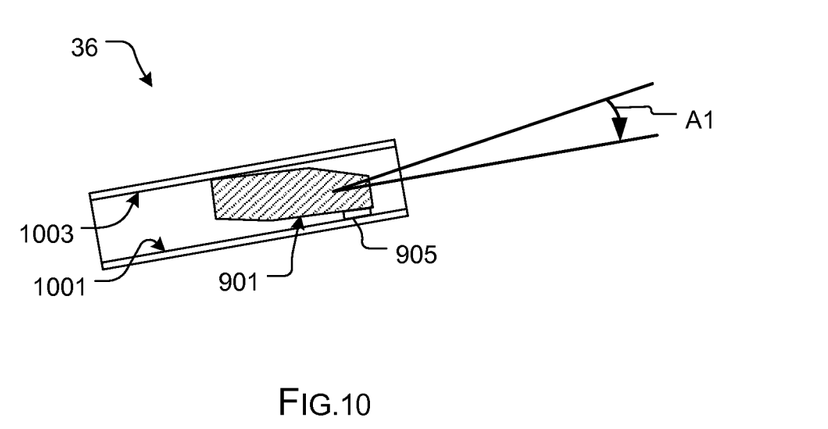

Referring now to FIGS. 9 and 10, a simplified cross-sectional view of end extension 46 is shown having a first surface 901 that comes into contact with a bottom surface 1001 of channel 36 and a second surface 903 that comes into contact with a top surface 1003 of channel 1003. During the inspection process, it is determined by measuring the gap 709 the angle rotation, as depicted with arrow A1, required to rotate the brake head 44 such that the brake shoe 34 simultaneously comes into contact with the tread near the top and bottom surface areas. Thus, the process step 811 includes treating surface 901 and/or surface 903 with additional material 905 and/or removing material from the surface. This feature enables the end extension 46 to slide within the channel 36 at a desired angle A1.

Figure 11:
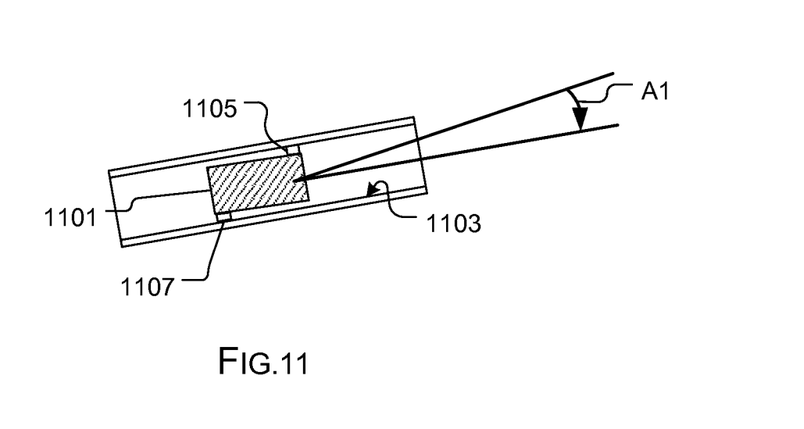
FIG. 11 is a side view of an end extension in accordance with an alternative embodiment of the present application.

It should be appreciated that the features discussed herein could be used with end extensions having different shapes and geometries. For example, FIG. 11 depicts an embodiment that could incorporate the features discussed herein. In the exemplary embodiment, end extension 1101 is oriented at a desired angle to slide within channel 1103 by securing materials 1105, 1107 to the opposing surface. Likewise, it should be appreciated that material from extension end 1101 could be removed in an alternative embodiment to achieve the desired angle.

Figure 12:
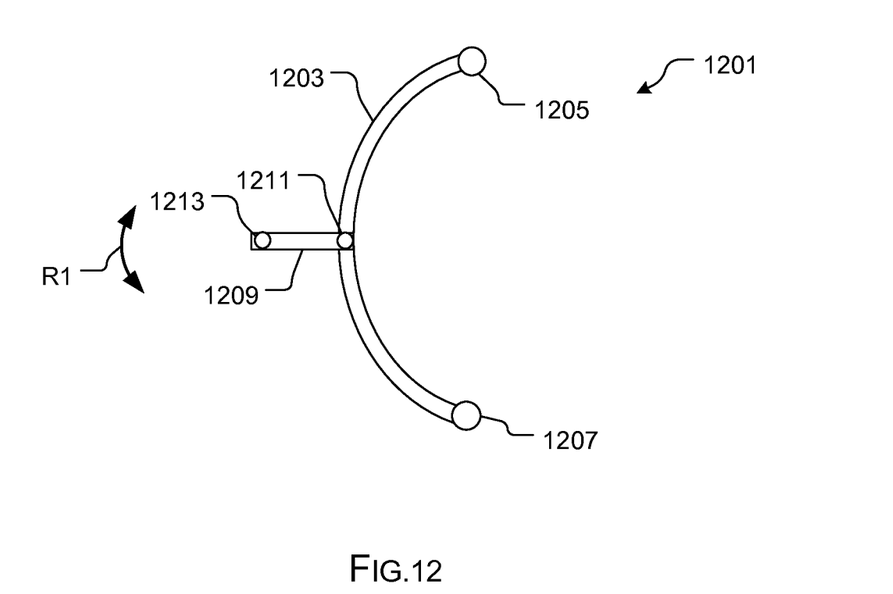
FIG. 12 is a side view of a braking inspection device in accordance with an alternative embodiment of the present application.
Figure 13:
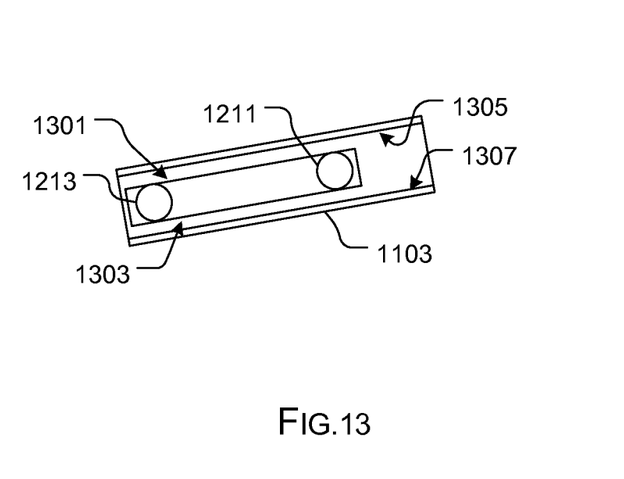
FIG. 13 is a side view of an end extension of the device of FIG. 12.
Figure 14:
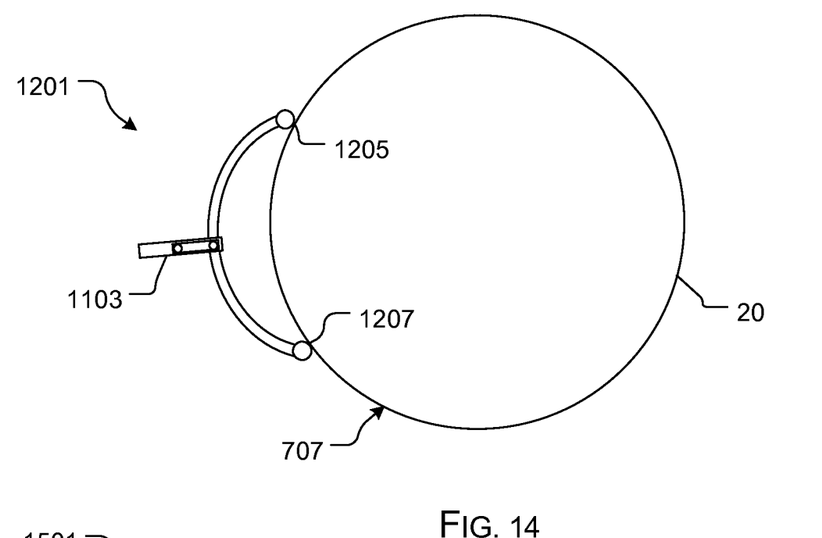
FIG. 14 is a side view of the braking inspection device of FIG. 12 with an associated wheel.

Referring now to FIG. 12 in the drawings, an inspection device 1201 is shown in accordance with an alternative embodiment of present application. Device 1201 is provided with an elongated body 1203 that includes two ends 1205, 1207 configured to come into contact with the tread surface 707 of the wheel 34. The elongated body 1203 is pivotally attached to a member 1209 having two end extensions 1211, 1213 configured to fit with within channel 1103. As depicted in FIG. 13, the end extension 1211 includes a first surface 1301 and a second surface 1303, while channel 1103 includes an inner upper surface 1305 and an inner lower surface 1307. As will be discussed more fully below, the orientation of surfaces 1301 and 1305 along with surfaces 1303 and 1307 relative to each other determines the material that is need to be added or taken away from the end extension 46 and/or 1101 to orient the end extension at the desired angle as discussed above.

Figure 15:
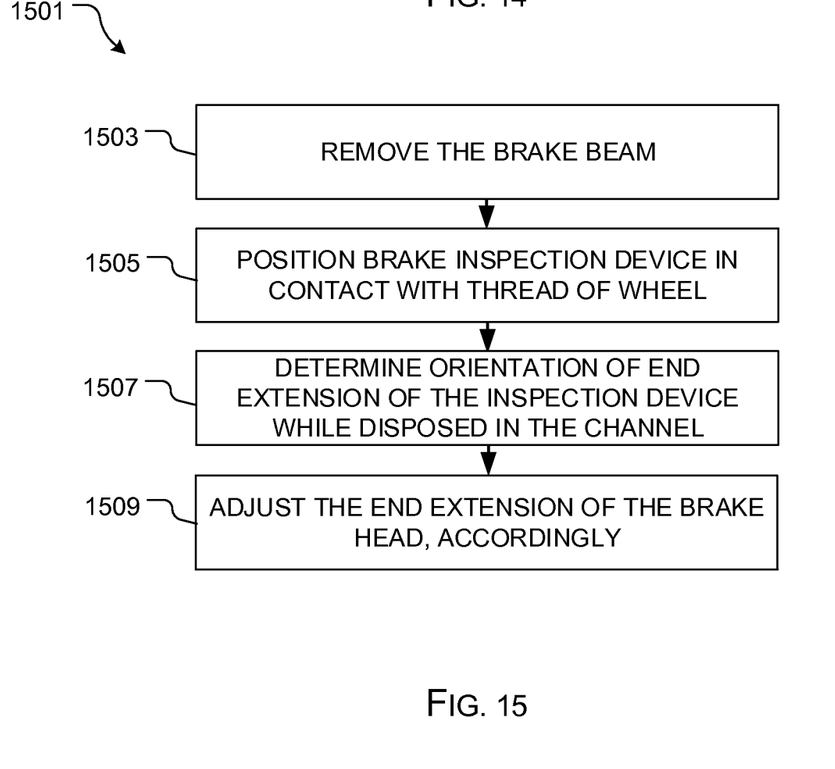
FIG. 15 is a simplified flowchart depicting an inspection process in accordance with an alternative embodiment of the present application.

FIG. 15 depicts a flowchart 1501 of process steps in accordance with an alternative embodiment of the present application that incorporates the use of device 1201. The first steps include removing the entire brake head and positioning the inspection device 1201 against the tread 707 of wheel 20. Thereafter, the end extension 1211 of device 1201 is placed within the channel and the orientation of the end extension 1211 is determined, as depicted in step 1507. Thereafter, the end extension 46 or 1101 is adjusted accordingly such that the preferred angle is achieved, as depicted in step 1509.

Figure 16:
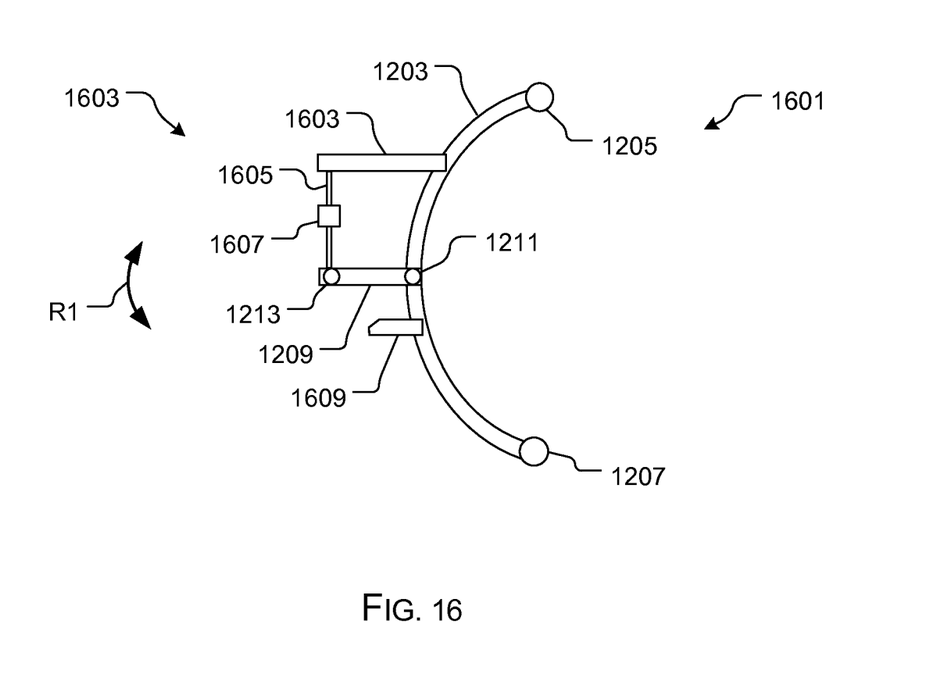
FIG. 16 is a side view of a braking inspection device in accordance with an alternative embodiment of the present application.

In FIG. 16, a side view of a braking inspection device 1601 is shown in accordance with an alternative embodiment of the present application. It will be appreciated that device 1601 is substantially similar in form and function to device 1201 and incorporates one of more of the features discussed above. However, in this embodiment, the device 1601 is further provided with a measuring system 1603 configured to determined the rotational movement of the end extensions 1211, 1213 within the channel.

Measuring system 1603 is provided with a member 1603 that rigidly attaches to elongated body 1203 and is in connection with member 1209 via a rod 1605 operably associated with a measuring device 1607 configured to determine the rotational movement R1 of the member 1209 relative to member 1603.

Figure 17:
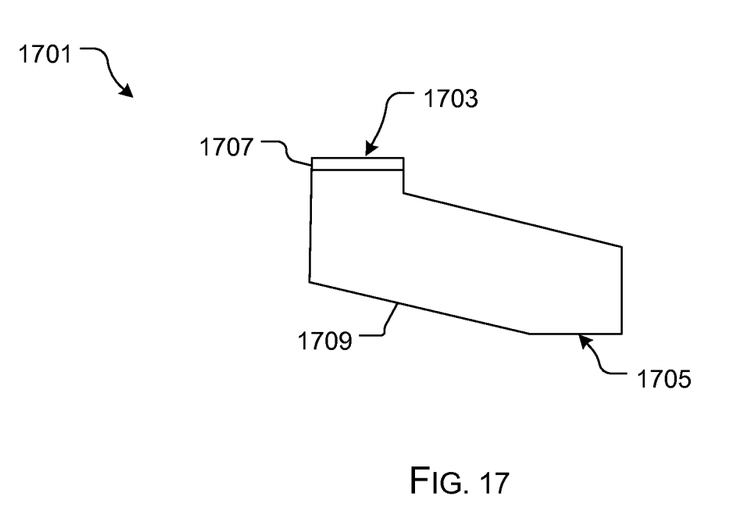
FIGS. 17 and 18 are side views of an end extension in accordance with an alternative embodiment of the present application.
Figure 18:
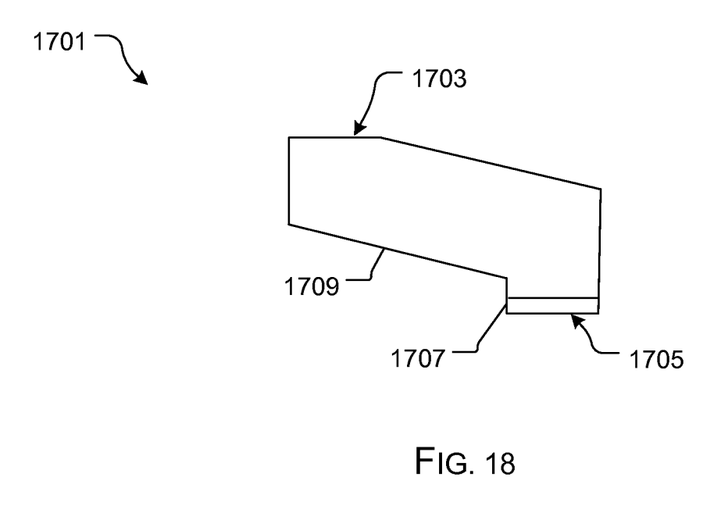

In FIGS. 17 and 18, side views of an end extension 1701 of the brake shoe are shown in accordance with an alternative embodiment of the present application. Extension 1701 includes a trailing edge 1703 and a leading edge 1705. During the preferred method of material removal and/or addition, material 1707 is either removed or added to the edges 1703, 1705 to form the desired alignment of end extension 1701 as it travels in the channel.

Figure 19:
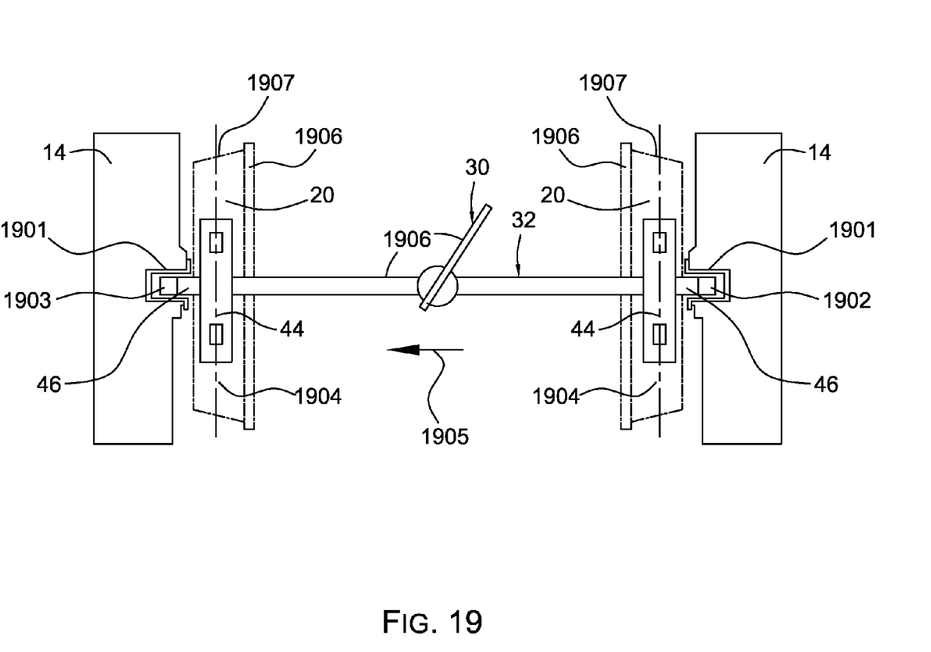
FIG. 19 shows a brake beam mounted in the side rails after the wear liners have been assembled into the side rails.

FIG. 19 shows a brake beam 32 mounted in the side rails 14 after the wear liners 1901 have been assembled into the side rails 14. When brake forces are applied to a lever 30 (see FIG. 1 for clarity) the angle 1906 between lever 30 and brake beam 32 frequently induces a side force 1905 in the direction as shown. This force can move the brake beam transverse to the truck assembly resulting in a misalignment of the centerlines 1904. Centerlines 1904 should be the same or close to the same for both the wheel 20 tread and the brake head 44. It can be seen that if the transverse movement is excessive the brake beam 32 brake heads 44 are relocated so that one brake head 44 will have some portion off the wheel tread 1907 reducing brake forces and the opposite brake head will engage the wheel flange 1906 causing altered brake forces and wear damaging the wheel flange 1907. The purpose of this invention is to add sufficient material 1903 to the end extension 46 so that the brake beam 32 brake head 44 centerline 1904 will be maintained close to the wheel 20 tread centerline 1904 when a resultant force 1905 is produced as the brake system is activated. Thereby the wheel 20 tread centerline 1904 and brake head 44 centerline 1904 will be maintained close one to the other as shown. The addition of material 1903 may result in excessive overall brake beam 32 length. For that condition the opposite brake head 44 end extension 46 should be shortened 1902 so that the industry standard length is maintained.

Figure 20:
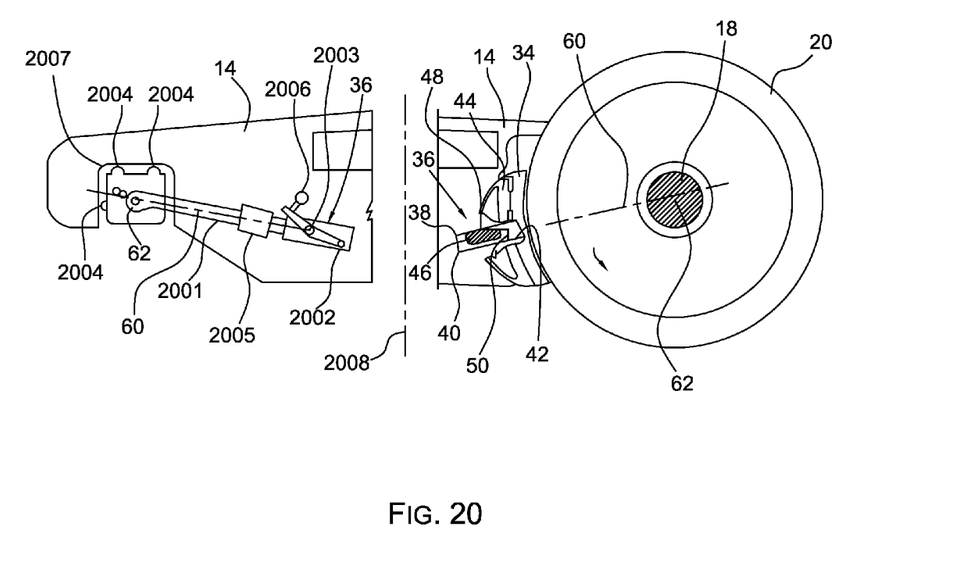
FIG. 20 shows the gauge placed in the side rail.

There are three methods to determine the adjustment needed to correct end extension 46 so that the brake head 44 face 705 will be nearly parallel to the wheel 20 tread surface 707 when the end extension 46 is diagonally restrained in side pocket 36 as shown in FIG. 7. The first method is shown in FIG. 7 where the truck assembly in FIG. 1 is complete with only the brake shoes 34 removed. The second method is shown in FIG. 16 where the brake shoes 34 and brake beams 32 are removed from the truck assembly shown in FIG. 1. FIG. 20 shows the third method where the brake shoes 34, the brake beams 32 and the wheels 20 are removed from the truck assembly shown in FIG. 1. FIG. 20 shows gauge 2001 placed in the side rail 14. Probes 2004 locate the gage 2001 in the wheel 20 mounting pocket 2007 and locates the centerline of where wheel 62 will be located. Adjuster 2005 adjusts the length of gage 2001 to match various wheel 20 sizes which typically range from approximately 28" to 38" diameter so that probe 2002 is located at the expected location for the lower leading surface 901 for the brake head 44 end extension 46 when probes 2004 are properly located. Probe 2003 is rotated to locate the upper trailing surface 48 in slot 36. A measuring device 2006 will, with commonly used mathematics, indicate the amount of adjustment 905 of the end extension 46 that will be needed to make brake head surface 705 nearly parallel to the wheel 20 tread surface 707 when the end extension 46 is diagonally restrained in side pocket 36. It is also anticipated that gauge 2001 could be used for inspection of new, reconditioned and used side rails and similar rail truck components for compliance with design or service requirements.

Figure 21:
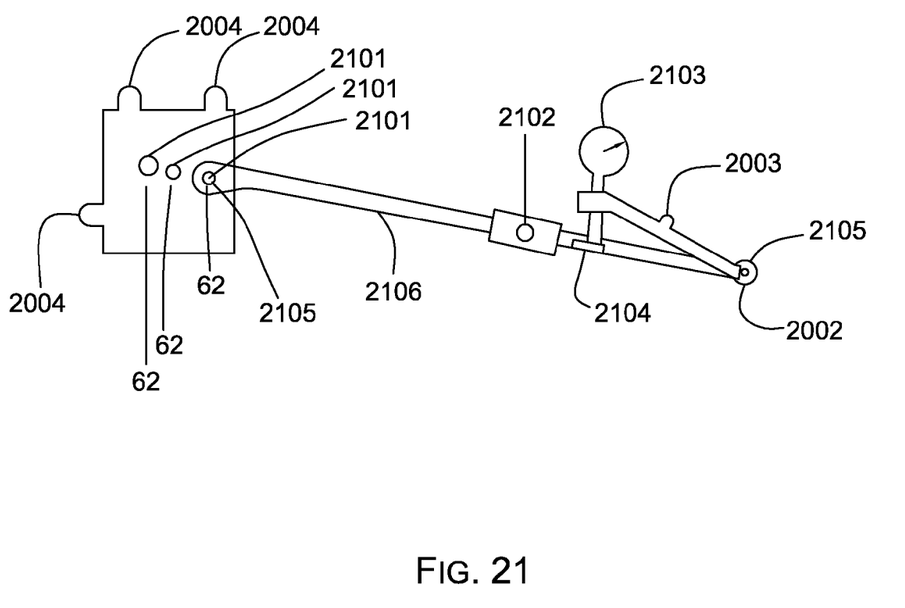
FIG. 21 shows additional features for the gauge of FIG. 20.

FIG. 21 shows additional features for gauge 2001. Probes 2004 are to be located in the side rail pocket 2007 as shown in FIG. 20. They could be manually held in place for gage application or could be held by mechanical, magnetic or other means. The center of the expected wheel 20 can be closely located by one of the holes 62. Larger wheels have larger axles and therefore the center will vary in relationship to the probes 2004. Pin 2105 locates arm 2106 at the appropriate hole 62 and allows arm 2106 freedom to move up and down. Adjuster 2102 can adjust the length of arm 2106 so that the end probe 2002 will be close to the lower leading surface 901 of the end extension 46. This adjustment 2102 allows for different wheel 20 diameters and different shoe 34 thicknesses. Probe 2002 will rest on the bottom surface 40 of slot 36. Stop 2104 is attached to arm 2106 and used as a measuring reference surface. While probe 2002 is resting on the bottom 40 of slot 36 probe 2003 is raised to the upper surface 38 of slot 36. Gauge indicator 2103 then measures the distance to the 2104 stop and through common mathematical calculations the unique opening of slot 36 is determined. This unique dimension will be used to determine the adjustment 905 needed on a brake beam 32 end extension 46 such that the brake head 44 face 705 will be nearly parallel to the wheel 20 tread face 707 when the adjusted 905 end extension 46 is diagonally restrained in slot 36. Similar applications are anticipated if the correction to end extension 46 is applied to the upper trailing 903 surface of end extension 46 or a combination of both.

Figure 22:
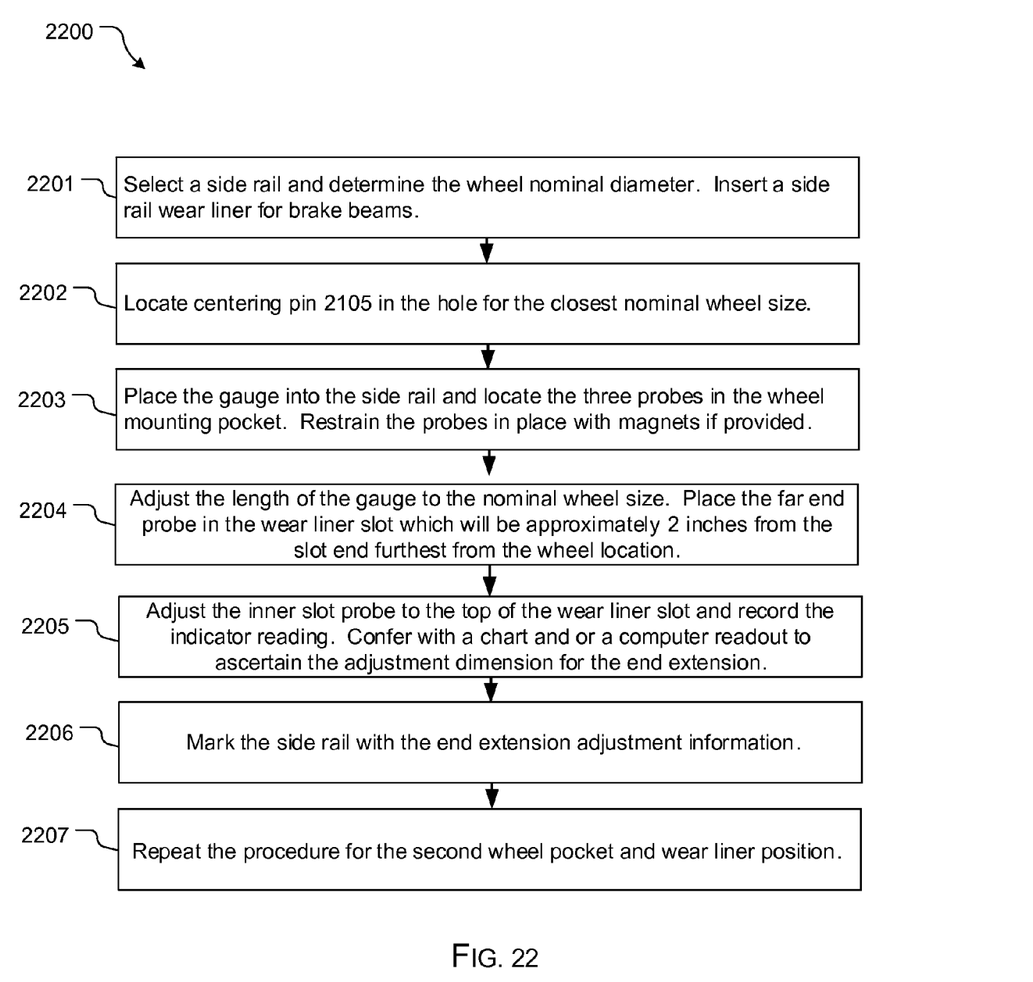
FIG. 22 depicts a flowchart in accordance with an alternative method of the present application.

FIG. 22 depicts a flowchart 2201 of steps in accordance with the preferred process of utilizing device 2001. As shown in box 2201, the first step includes selecting a side rail and determine the wheel nominal diameter. Insert a side rail wear liner for brake beams. The next step includes locating the centering pin 2105 in the hole for the closest nominal wheel size, as depicted in box 2202. Next, placing the gauge into the side rail and locate the three probes in the wheel mounting pocket. Restrain the probes in place with magnets if provided, as depicted in box 2203. Next, adjusting the length of the gauge to the nominal wheel size. Place the far end probe in the wear liner slot which will be approximately 2 inches from the slot end furthest from the wheel location, as depicted in box 2204. The process continues with adjusting the inner slot probe to the top of the wear liner slot and record the indicator reading and conferring with a chart and or a computer readout to ascertain the adjustment dimension for the end extension, as depicted in box 2205. Next, marking the side rail with the end extension adjustment information, as depicted in box 2206. It should be noted that later a brake beam end extension will be selected or adjusted to match with this side rail wear liner pocket. Finally, the process is repeated for the second wheel pocket and wear liner position, as depicted in box 2207.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to inspect and compensate for wear on a brake shoe of a railcar brake system, comprising:
   selecting a side rail and determine a railcar wheel nominal diameter;
   inserting a side rail wear liner for brake beams;
   locating a centering pin in a hole for the closest nominal wheel size;
   placing a gauge into the side rail and locating three probes in a wheel mounting pocket;
   restraining the three probes in place with a fastening means;
   adjusting the length of the gauge to the nominal wheel size;
   placing one end of the probe in a wear liner slot; and
   repeating the process for additional wheel pockets and wear liner positions.

2. The method of claim 1, wherein the process of restraining the three probes is achieved via a magnet.

3. The method of claim 1, wherein the process of adjusting the gauge includes placing the end of the probe in the wear line at approximately 2 inches in a slot end furthest from a wheel location.

\* \* \* \* \*